United States Patent
Finnegan

(10) Patent No.: US 12,329,350 B2
(45) Date of Patent: Jun. 17, 2025

(54) ROBOTIC CLEANER

(71) Applicant: SHARKNINJA OPERATING LLC, Needham, MA (US)

(72) Inventor: Michael William Finnegan, Medford, MA (US)

(73) Assignee: SharkNinja Operating LLC, Needham, MA (US)

( * ) Notice: Subject to any disclaimer, the term of this patent is extended or adjusted under 35 U.S.C. 154(b) by 526 days.

(21) Appl. No.: 17/739,999

(22) Filed: May 9, 2022

(65) Prior Publication Data
US 2023/0355065 A1    Nov. 9, 2023

(51) Int. Cl.
A47L 9/28      (2006.01)
A47L 9/00      (2006.01)
G05D 1/00      (2024.01)

(52) U.S. Cl.
CPC .............. *A47L 9/2852* (2013.01); *A47L 9/009* (2013.01); *A47L 9/2805* (2013.01); *G05D 1/0212* (2013.01); *A47L 2201/04* (2013.01)

(58) Field of Classification Search
CPC ...... A47L 9/2852; A47L 9/009; A47L 9/2805; A47L 2201/04; G05D 1/0212; G05D 1/0219
See application file for complete search history.

(56) References Cited

U.S. PATENT DOCUMENTS 9,327,407 B2 *   5/2016   Jones ................. G05D 1/0227
2013/0058635 A1  3/2013   Vrdoljak
2013/0152337 A1  6/2013   Thorne
2014/0150201 A1  6/2014   McGee et al.
2015/0013102 A1  1/2015   Bilger
2015/0040340 A1  2/2015   Bilger et al.
2015/0135474 A1  5/2015   Gidwell
2015/0297054 A1  10/2015  Weeks et al.
2015/0351596 A1  12/2015  Thorne
2016/0128530 A1  5/2016   Thorne et al.
2016/0174793 A1  6/2016   Burke et al.
2016/0220080 A1  8/2016   Thorne
2016/0220081 A1  8/2016   Xu et al.
2016/0220082 A1  8/2016   Thorne et al.
(Continued)

FOREIGN PATENT DOCUMENTS

CN    105491931    4/2016
CN    106970625    7/2017
(Continued)

OTHER PUBLICATIONS

KR102115192B1; Lee et al. May 2020; machine translation (Year: 2020).*

*Primary Examiner* — David Redding
(74) *Attorney, Agent, or Firm* — Grossman Tucker Perreault & Pfleger, PLLC

(57) ABSTRACT

A robotic cleaner may include one or more driven wheels and a controller communicatively coupled to the one or more driven wheels. The controller may be configured to cause: the robotic cleaner to move along a cleaning path that includes one or more row portions and one or more turnaround portions, the robotic cleaner to stop forward movement at a first cleaning point, and the robotic cleaner to rotate in a rotation direction at the first cleaning point, the rotation direction being only one of clockwise or counter clockwise.

10 Claims, 2 Drawing Sheets

(56) References Cited

U.S. PATENT DOCUMENTS

| | | |
|---|---|---|
| 2016/0324388 A1 | 11/2016 | Vrdoljak et al. |
| 2016/0374533 A1 | 12/2016 | Innes et al. |
| 2017/0042319 A1 | 2/2017 | Conrad et al. |
| 2017/0112343 A1 | 4/2017 | Innes et al. |
| 2017/0127896 A1 | 5/2017 | Carter et al. |
| 2017/0144810 A1 | 5/2017 | Birdsell |
| 2017/0215667 A1 | 8/2017 | Thorne et al. |
| 2017/0347848 A1 | 12/2017 | Carter et al. |
| 2018/0035854 A1 | 2/2018 | Thorne |
| 2018/0064301 A1 | 3/2018 | Cottrell et al. |
| 2018/0068815 A1 | 3/2018 | Cottrell |
| 2018/0070785 A1 | 3/2018 | Udy et al. |
| 2018/0255991 A1 | 9/2018 | Der Marderosian et al. |
| 2018/0296046 A1 | 10/2018 | Thorne et al. |
| 2018/0306432 A1 | 10/2018 | Ognjen et al. |
| 2018/0325252 A1 | 11/2018 | Hopke et al. |
| 2018/0338654 A1 | 11/2018 | Kelsey |
| 2018/0338656 A1 | 11/2018 | Carter et al. |
| 2019/0038098 A1 | 2/2019 | Thorne et al. |
| 2019/0059668 A1 | 2/2019 | Thorne et al. |
| 2019/0069740 A1 | 3/2019 | Thorne et al. |
| 2019/0069744 A1 | 3/2019 | Liggett et al. |
| 2019/0090701 A1 | 3/2019 | Tonderys et al. |
| 2019/0090705 A1 | 3/2019 | Thorne et al. |
| 2019/0191947 A1 | 6/2019 | Freese et al. |
| 2019/0193120 A1 | 6/2019 | Brown et al. |
| 2019/0246853 A1 | 8/2019 | Sardar et al. |
| 2019/0274500 A1 | 9/2019 | Thorne et al. |
| 2019/0274501 A1 | 9/2019 | Antonisami et al. |
| 2019/0302793 A1 | 10/2019 | Leech et al. |
| 2019/0320865 A1 | 10/2019 | Brown et al. |
| 2019/0320866 A1 | 10/2019 | Thorne et al. |
| 2019/0335968 A1 | 11/2019 | Harting et al. |
| 2019/0343349 A1 | 11/2019 | Clare et al. |
| 2019/0357740 A1 | 11/2019 | Thorne et al. |
| 2020/0000298 A1 | 1/2020 | Brown et al. |
| 2020/0022543 A1 | 1/2020 | Gill et al. |
| 2020/0022544 A1 | 1/2020 | Gill et al. |
| 2020/0022553 A1 | 1/2020 | Gill et al. |
| 2020/0037833 A1 | 2/2020 | Niedzwecki et al. |
| 2020/0037843 A1 | 2/2020 | Fiebig et al. |
| 2020/0046184 A1 | 2/2020 | Freese et al. |
| 2020/0077855 A1 | 3/2020 | Brown et al. |
| 2020/0085267 A1 | 3/2020 | Thorne et al. |
| 2020/0085269 A1 | 3/2020 | Thorne |
| 2020/0121144 A1 | 4/2020 | Gacin et al. |
| 2020/0121148 A1 | 4/2020 | Hoffman et al. |
| 2020/0138260 A1 | 5/2020 | Sutter et al. |
| 2020/0166949 A1 | 5/2020 | Leech et al. |
| 2020/0170470 A1 | 6/2020 | Liggett et al. |
| 2020/0201348 A1 | 6/2020 | Leech |
| 2020/0205631 A1 | 7/2020 | Brown et al. |
| 2020/0205634 A1 | 7/2020 | Sutter et al. |
| 2020/0237171 A1 | 7/2020 | Xu et al. |
| 2020/0288929 A1 | 9/2020 | Brunner |
| 2020/0288930 A1 | 9/2020 | Wells |
| 2020/0297172 A1 | 9/2020 | Tonderys et al. |
| 2020/0301430 A1 | 9/2020 | Irkliy et al. |
| 2020/0315418 A1 | 10/2020 | Howard et al. |
| 2020/0345196 A1 | 11/2020 | Innes et al. |
| 2020/0367711 A1 | 11/2020 | Thorne et al. |
| 2020/0371526 A1 | 11/2020 | Kamada |
| 2020/0383547 A1 | 12/2020 | Sutter et al. |
| 2021/0007569 A1 | 1/2021 | Howard et al. |
| 2021/0022574 A1 | 1/2021 | Harting |
| 2021/0030227 A1 | 2/2021 | Mathieu et al. |
| 2021/0038032 A1 | 2/2021 | Brown |
| 2021/0059495 A1 | 3/2021 | Gill et al. |
| 2021/0085144 A1 | 3/2021 | Woodrow et al. |
| 2021/0169289 A1 | 6/2021 | Thorne et al. |
| 2021/0175772 A1 | 6/2021 | Aini |
| 2021/0177223 A1 | 6/2021 | Der Marderosian et al. |
| 2021/0186282 A1 | 6/2021 | Sun et al. |
| 2021/0204684 A1 | 7/2021 | Heman-Ackah et al. |
| 2021/0254615 A1 | 8/2021 | Vrdoljak et al. |
| 2021/0307581 A1 | 10/2021 | Thorne et al. |
| 2021/0315428 A1 | 10/2021 | Udy et al. |
| 2021/0386261 A1 | 12/2021 | Woodrow et al. |
| 2021/0386262 A1 | 12/2021 | Uchendu et al. |
| 2022/0031131 A1 | 2/2022 | McClay et al. |
| 2022/0031133 A1 | 2/2022 | Der Marderosian et al. |
| 2022/0031134 A1 | 2/2022 | Yang et al. |
| 2022/0061614 A1 | 3/2022 | Yu et al. |
| 2022/0071459 A1 | 3/2022 | Gacin et al. |
| 2022/0095864 A1 | 3/2022 | Der Marderosian et al. |
| 2022/0125256 A1 | 4/2022 | Lessard et al. |
| 2022/0287521 A1 | 9/2022 | Cottrell et al. |
| 2022/0322903 A1 | 10/2022 | Lessard |
| 2022/0400922 A1 | 12/2022 | McClay et al. |
| 2022/0408994 A1 | 12/2022 | Hill |
| 2023/0043567 A1 | 2/2023 | Copeland et al. |
| 2023/0070147 A1 | 3/2023 | Harting et al. |
| 2023/0157495 A1 | 5/2023 | Copeland et al. |
| 2023/0180986 A1 | 6/2023 | Shin et al. |
| 2023/0248192 A1 | 8/2023 | Brown et al. |
| 2023/0320550 A1 | 10/2023 | Teuscher et al. |
| 2023/0329502 A1 | 10/2023 | Chirikjian |
| 2023/0355065 A1 | 11/2023 | Finnegan et al. |
| 2023/0414052 A1 | 12/2023 | McClay et al. |
| 2024/0008699 A1 | 1/2024 | Innes et al. |
| 2024/0415352 A1 | 12/2024 | McClay et al. |

FOREIGN PATENT DOCUMENTS

| | | | |
|---|---|---|---|
| CN | 108113583 | 6/2018 | |
| CN | 113208511 | 8/2021 | |
| KR | 20050010591 | 1/2005 | |
| KR | 102115192 B1 * | 5/2020 | ......... B25J 11/0085 |
| WO | 2021215871 | 10/2021 | |

* cited by examiner

ROBOTIC CLEANER

TECHNICAL FIELD

The present disclosure is generally directed to a robotic cleaner and more specifically to methods of cleaning using a robotic cleaner.

BACKGROUND INFORMATION

Autonomous cleaning devices (e.g., robotic cleaners) are configured to autonomously navigate a surface while at least partially cleaning the surface. One example of an autonomous cleaning device is a robotic vacuum cleaner. A robotic vacuum cleaner may include a suction motor, a dust cup fluidly coupled to the suction motor, and one or more driven wheels configured to urge the robotic vacuum cleaner across a surface to be cleaned. In operation, the robotic vacuum cleaner traverses the surface to be cleaned while collecting at least a portion of any debris present on the surface to be cleaned.

BRIEF DESCRIPTION OF THE DRAWINGS

These and other features and advantages will be better understood by reading the following detailed description, taken together with the drawings, wherein.

DETAILED DESCRIPTION

The present disclosure is generally directed to a robotic cleaner. The robotic cleaner may include one or more driven wheels and a controller. The one or more driven wheels are configured to urge the robotic cleaner across a surface to be cleaned (e.g., a floor). The controller is configured to control the one or more driven wheels such that the robotic cleaner traverses the surface to be cleaned according to a cleaning pattern. One example cleaning pattern may include one or more row portions and one or more turnaround portions. While traversing the one or more row portions, the controller may be configured to cause the robotic cleaner to periodically stop forward movement along a row portion at one or more cleaning points. When the robotic cleaners stops forward movement at a cleaning point, the controller may cause the robotic cleaner to rotate (e.g., through differentially rotating a plurality of driven wheels). Rotation at the cleaning points may improve cleaning performance (e.g., when compared to the robotic cleaner traversing the row without stopping and rotating).

Figure 1:
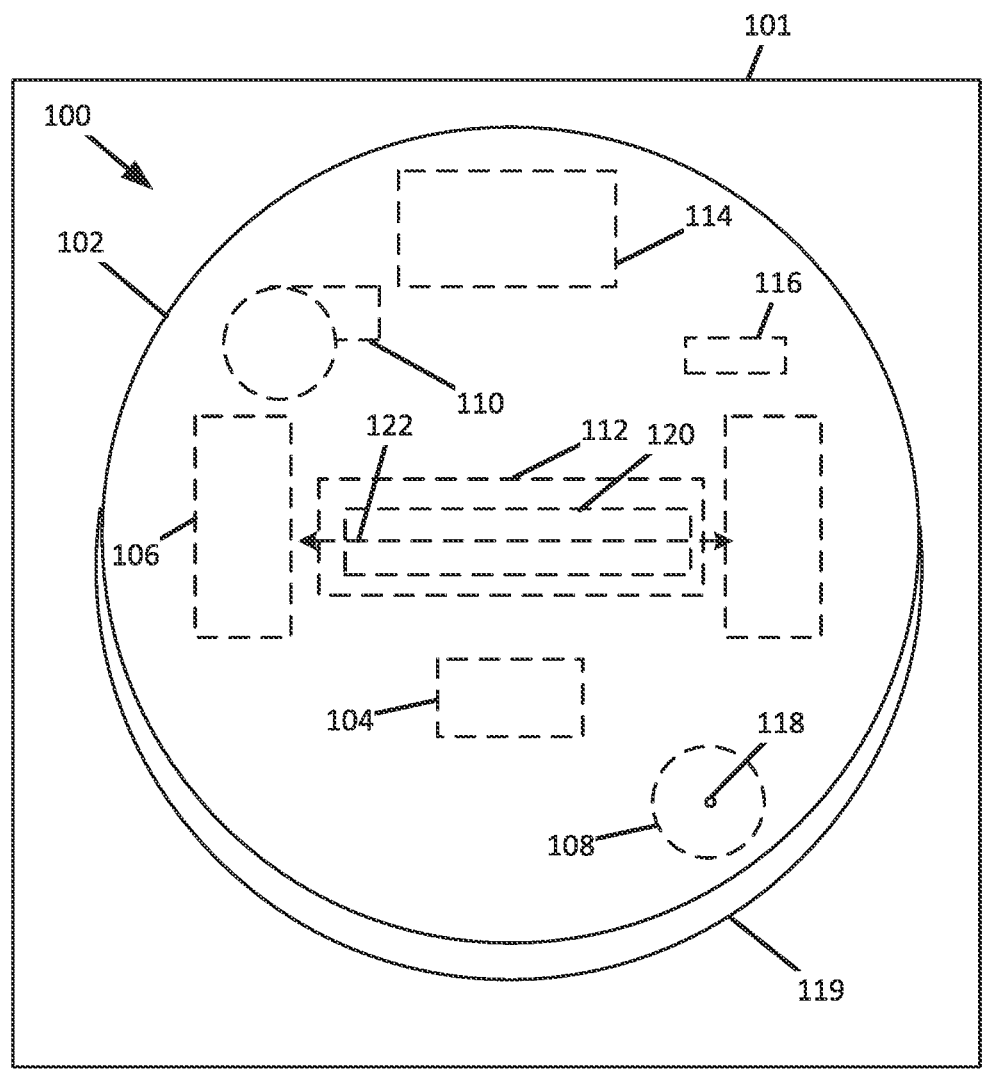
FIG. 1 is a schematic example of a robotic cleaner, consistent with embodiments of the present disclosure.

FIG. 1 shows a schematic example of a robotic cleaner 100 (e.g., a robotic vacuum cleaner). As shown, the robotic cleaner 100 includes a body 102, a controller 104, one or more driven wheels 106, one or more edge cleaning implements 108, a suction motor 110, a suction inlet 112 fluidly coupled to the suction motor 110, a dust cup 114 fluidly coupled to the suction inlet 112 such that the suction motor 110 urges debris into the dust cup 114 through the suction inlet 112, and one or more environmental sensors 116.

Examples of the one or more edge cleaning implements 108 may include a side brush (e.g., having one or more bristles that extend within and/or beyond a perimeter of the robotic cleaner 100), an air jet assembly (e.g., configured to generate a directed stream of air that extends outwardly from the body 102 of the robotic cleaner 100 in a manner that is configured to disturb debris adjacent the robotic cleaner 100), and/or any other edge cleaning implement. For the purposes of clarity herein, the one or more edge cleaning implements 108 will be generally discussed in the context of one or more side brushes. The controller 104 is communicatively coupled to one or more of the one or more driven wheels 106, the one or more side brushes 108, the suction motor 110, and/or the one or more environmental sensors 116.

The one or more environmental sensors 116 may be configured to detect one or more obstacles in a movement path of the robotic cleaner 100. An obstacle may include a non-traversable drop-off (e.g., a cliff) in a surface to be cleaned (e.g., a floor) 101 and/or a vertically extending (e.g., a vertical) surface (e.g., a wall or piece of furniture) extending from the surface to be cleaned 101. For example, the controller 104 can be configured to receive at least one input from at least one of the one or more environmental sensors 116 and, based, at least in part, on the input, control the rotational speed of the one or more driven wheels 106 (e.g., to avoid a collision with an obstacle in the path of the robotic cleaner 100). By way of further example, the controller 104 can be configured to receive at least one input from at least one of the one or more environmental sensors 116 indicative of a vertically extending surface of an obstacle (e.g., a wall or furniture) in a movement path of the robotic cleaner 100 and, in response to receiving the signal, cause the robotic cleaner 100 to carry out a method of cleaning proximate to the vertically extending surface. The method of cleaning proximate to the vertically extending surface may include causing the robotic cleaner 100 to move through a rotation angle such that at least one of the one or more side brushes 108 approaches the vertically extending surface.

The one or more environmental sensors 116 may include, for example, one or more of an infrared (IR) sensor, an ultrasonic sensor, a stereo or monocular camera, a tactile switch (e.g., actuated in response to displacement of a displaceable bumper), a magnetic field sensor, and/or any other type of environmental sensor.

The one or more side brushes 108 may be configured to extend within or beyond a periphery of the robotic cleaner 100. For example, each of the one or more side brushes 108 may not extend beyond a periphery of the body 102 of the robotic cleaner 100. In some instances, a rotational speed of the one or more side brushes 108 may be varied. For example, the rotational speed of the one or more side brushes 108 may be varied in response to at least one of the one or more environmental sensors 116 detecting an obstacle. By way of further example, in some instances, the rotational speed of the one or more side brushes 108 may be varied based on a direction of movement (e.g., forward movement, reverse movement, or turning movement).

As shown, the one or more side brushes 108 are configured to rotate about a respective side brush rotational axis 118 that extends transverse to (e.g., perpendicular to) a bottom surface of the body 102 of the robotic cleaner 100. In other words, each side brush rotational axis 118 of the one or more side brushes 108 extends transverse to (e.g., perpendicular to) the surface to be cleaned 101. In some instances, the one or more side brushes 108 may extend substantially (e.g., within 1°, 2°, 5°, or 10° of) perpendicular to the surface to be cleaned 101. The one or more side brushes 108 are configured to rotate about each side brush rotational axis 118 such that the one or more side brushes 108 urge debris on the surface to be cleaned 101 in a direction of a movement path of the suction inlet 112.

As shown, the one or more side brushes 108 may be positioned forward of the suction inlet 112, relative to a forward movement direction of the robotic cleaner 100. In other words, the one or more side brushes 108 may be positioned between a forward most portion of the robotic cleaner 100 (e.g., a displaceable bumper 119) and the suction inlet 112.

The suction inlet 112 may also include an agitator 120 (e.g., a brush roll) configured to rotate about an agitator rotational axis 122. The agitator 120 is configured to agitate the surface to be cleaned 101, dislodging at least a portion of any debris on the surface to be cleaned 101. The agitator rotational axis 122 may extend parallel to or substantially (e.g., within 1°, 2°, 5°, or 10° of) parallel to the surface to be cleaned 101.

Figure 2:
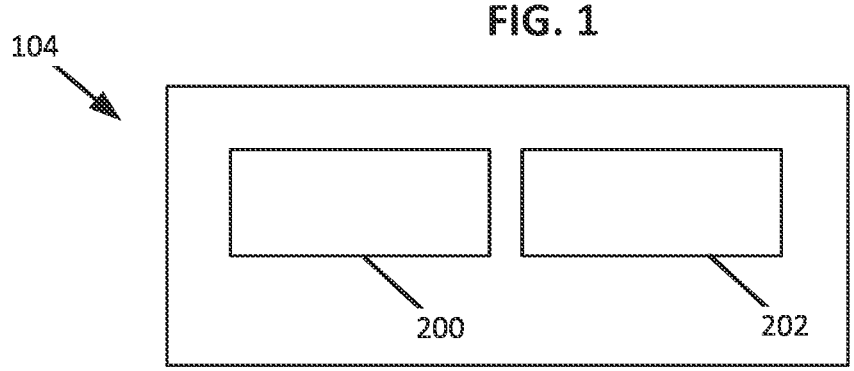
FIG. 2 is a schematic example of a controller of the robotic cleaner of FIG. 1, consistent with embodiments of the present disclosure.

FIG. 2 shows a schematic example of the controller 104. As shown, the controller 104 includes one or more processors 200 and one or more memories 202 (e.g., non-transitory memories) communicatively coupled to the one or more processors 200. The one or more memories 202 are configured to store one or more instructions that are configured to be executed by the one or more processors 200. Execution of the one or more instructions by the one or more processors 200 causes the robotic cleaner 100 to carry out one or more behaviors (e.g., obstacle avoidance, cleaning patterns, movement speed, and/or any other behavior).

Figure 3:
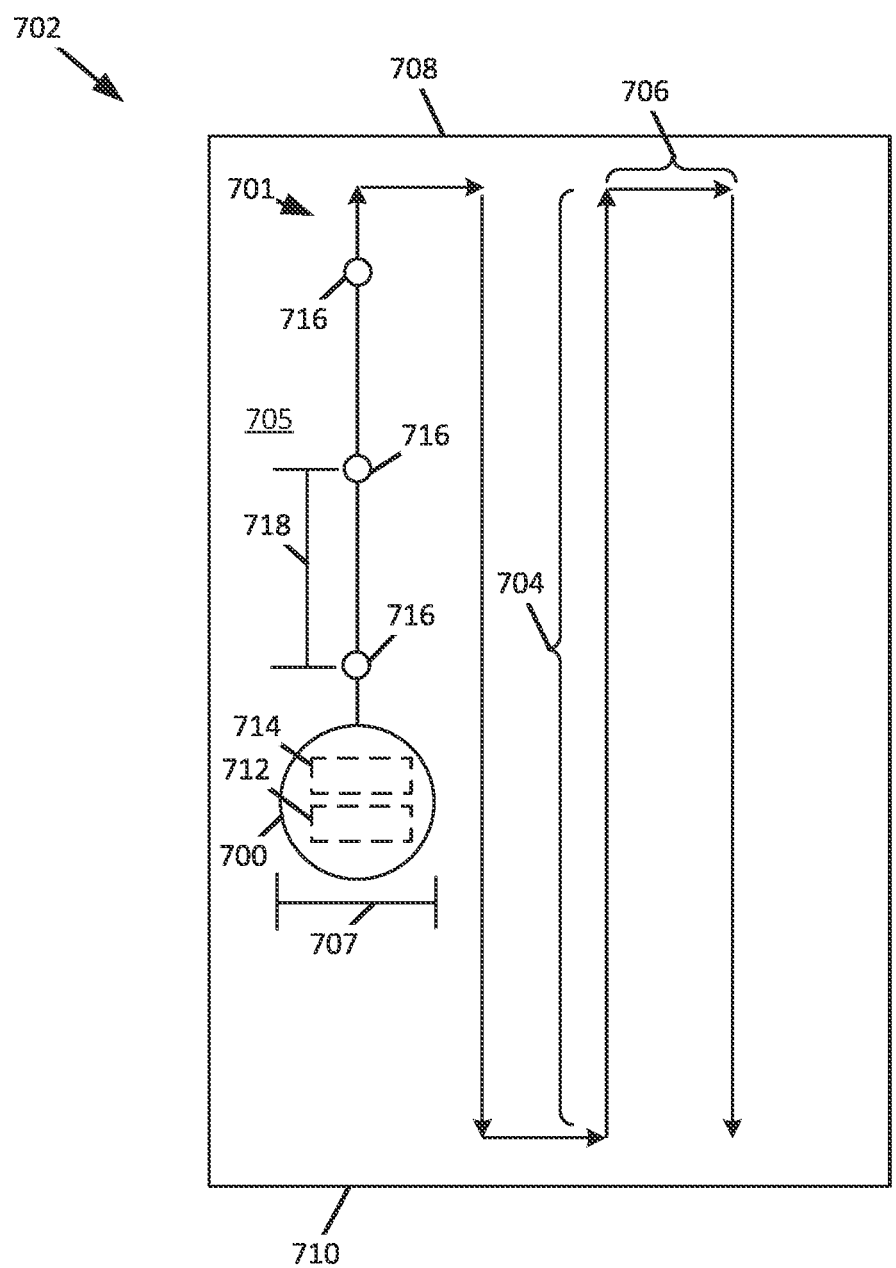
FIG. 3 is a schematic example of a robotic cleaner traveling along a cleaning path having one or more row portions and one or more turn-around portions, consistent with embodiments of the present disclosure.

FIG. 3 shows an example of a robotic cleaner 700, which may be an example of the robotic cleaner 100 of FIG. 1, carrying out a cleaning operation while traveling along a surface to be cleaned 705 (e.g., a floor) within an area 702 (e.g., a room of a house). As shown, the robotic cleaner 700 is caused to travel along a cleaning path 701. The cleaning path 701 of the robotic cleaner 700 includes one or more row portions 704 and one or more turn-around portions 706. Each row portion 704 extends transverse to (e.g., perpendicular to) an obstacle 708 (e.g., a wall) such that, while traveling according to a forward movement direction, the robotic cleaner 700 approaches the obstacle 708. Each turn-around portion 706 corresponds to a location where the robotic cleaner 700 changes direction. For example, while traveling according to a forward movement direction after traversing a turn-around portion 706 that is proximate to the obstacle 708, the robotic cleaner 700 moves away from the obstacle 708 and towards an opposing obstacle 710.

The cleaning operation may include may include executing a mopping and/or suction cleaning behavior while traversing the cleaning path 701. For example, the robotic cleaner 700 may include a mop unit 712 and a suction unit 714 that may be selectively operated while traversing the cleaning path 701.

While traversing each row portion 704, the robotic cleaner 700 may be configured to stop forward movement at one or more cleaning points 716. Each cleaning point 716 may be spaced apart by a point separation distance 718. The positioning and/or spacing of each cleaning point 716 may be predetermined and/or repeating. The point separation distance 718 may be substantially equal to a widest width 707 of the robotic cleaner 700. By way of further example, the point separation distance 718 may be in a range of 25 centimeters (cm) to 50 cm. By way of still further example, the point separation distance 718 may be in a range of 10 cm to 25 cm. By way of still further example, the separations distance 718 may be substantially 17 cm.

When the robotic cleaner 700 stops at each cleaning point 716, the robotic cleaner 700 may be caused to carry out a point behavior. Once the robotic cleaner 700 completes the point behavior, the robotic cleaner 700 may resume traversing the respective row portion 704 until the robotic cleaner 700 reaches the next cleaning point 716. This behavior may be repeated until the robotic cleaner 700 reaches a respective turnaround portion 706. At the turnaround portion 706, the robotic cleaner 700 may be caused to turn around and follow an adjacent row portion 704. While traversing the adjacent row portion 704, the robotic cleaner may be configured to stop forward movement at one or more cleaning points 716. The cleaning points 716 of the adjacent row portion 704 may be staggered relative to the cleaning points 716 of the immediately prior row portion 704. Alternatively, the cleaning points 716 of the adjacent row portion 704 may correspond to the cleaning points 716 of the immediately prior row portion 704.

The point cleaning behavior may include causing the robotic cleaner 700 to rotate in place. As the robotic cleaner 700 rotates in place, the mop unit 712 and/or suction unit 714 may collect additional debris. When rotating in place, the robotic cleaner 700 may be caused to rotate through at least one full rotation. In some instances, the robotic cleaner 700 may be caused to rotate through multiple (e.g., two or more) full rotations. By rotating through complete rotations, a forward direction of travel of the robotic cleaner 700 may be substantially realigned with the respective row portion 704. In some instances, upon reaching a respective cleaning point 716, the robotic cleaner 700 may be caused to rotate in a first rotation direction for a first rotation angle and in a second rotation direction for a second rotation angle, the first rotation direction being opposite the second rotation direction and the first rotation angle being substantially equal to the second rotation angle. As such, a forward direction of travel of the robotic cleaner 700 may be substantially realigned with the respective row portion 704 after completion of rotation in the first and second directions.

For example, upon reaching a first cleaning point 716, while traversing the row portion 704, the robotic cleaner 700 may be caused to rotate through one full rotation in a clockwise or counter clockwise direction. After completing the full rotation, the robotic cleaner 700 may resume traversing the row portion 704. Upon reaching a second cleaning point 716, the robotic cleaner 700 may be caused to rotate through one full rotation in a clockwise or counter clockwise direction. By way of further example, upon reaching a first cleaning point 716, while traversing the row portion 704, the robotic cleaner 700 may be caused to rotate through one full rotation in a clockwise or counter clockwise direction. After completing the full rotation, the robotic cleaner 700 may resume traversing the row portion 704. Upon reaching a second cleaning point 716 the robotic cleaner 700 may be caused to rotate through one full rotation in the other of a clockwise or counter clockwise direction. In other words, the robotic cleaner 700 may alternate rotation directions between successive cleaning points 716. By way of still further example, upon reaching a first cleaning point 716, while traversing the row portion 704, the robotic cleaner 700 may be caused to rotate through one full rotation in a clockwise or counter clockwise direction. After completing the full rotation, the robotic cleaner 700 may resume traversing the row portion 704. Upon reaching a second cleaning point 716 the robotic cleaner 700 may be caused to rotate through one full rotation in the same rotation direction as at the first cleaning point 716.

Additionally, or alternatively, the point cleaning behavior may include adjusting one or more of a behavior of the mop unit 712 and/or the suction unit 714. For example, when the mop unit 712 includes an agitated mop, the point cleaning behavior may include increasing and/or decreasing an agitation rate of the agitated mop. By way of further example, the cleaning behavior may include increasing and/or decreasing a suction force generated by the suction unit 714. By way of still further example, the point cleaning behavior may include increasing and/or decreasing a force applied to the surface to be cleaned 705 by the mop unit 712.

In some instances, the spacing between the cleaning points 716 may be adjustable (e.g., by a user and/or a cleaning profile). For example, a user may be able to indicate a region with increased debris (e.g., using a map generated on a mobile device, such as a mobile phone, communicatively coupled to the robotic cleaner 700). Within the region with increased debris, the point separation distance 718 may be less than point separation distance 718 outside the region of increased debris. By way of further example, the robotic cleaner 700 may be configured to execute various cleaning profiles (e.g., quick clean, normal clean, enhanced clean, etc.). The cleaning profiles may be configured to vary the point separation distance 718. In some instances (e.g., in a quick clean profile), the robotic cleaner 700 may be configured to ignore or not generate cleaning points 716.

An example of a robotic cleaner, consistent with the present disclosure, may include one or more driven wheels, one or more environmental sensors, one or more edge cleaning implements, and a controller communicatively coupled to the one or more driven wheels and the one or more environmental sensors. The controller may be configured to cause: the robotic cleaner to move along a cleaning path that includes one or more row portions and one or more turn-around portions, the robotic cleaner to stop forward movement at a first cleaning point, and the robotic cleaner to rotate in a rotation direction at the first cleaning point, the rotation direction being only one of clockwise or counter clockwise.

Another example of a robotic cleaner, consistent with the present disclosure, may include one or more driven wheels, one or more environmental sensors, and a controller communicatively coupled to the one or more driven wheels and the one or more environmental sensors. The controller may be configured to cause: the robotic cleaner to move along a cleaning path that includes one or more row portions and one or more turn-around portions, the robotic cleaner to stop forward movement at a first cleaning point, and the robotic cleaner to rotate in a rotation direction at the first cleaning point, the rotation direction being only one of clockwise or counter clockwise.

Another example of a robotic cleaner, consistent with the present disclosure, may include one or more driven wheels and a controller communicatively coupled to the one or more driven wheels. The controller may be configured to cause: the robotic cleaner to move along a cleaning path that includes one or more row portions and one or more turn-around portions, the robotic cleaner to stop forward movement at a first cleaning point, and the robotic cleaner to rotate in a rotation direction at the first cleaning point, the rotation direction being only one of clockwise or counter clockwise.

In some instances, the controller may be configured to cause the robotic cleaner to rotate through one complete rotation in the rotation direction at the first cleaning point. In some instances, the controller may be configured to cause the robotic cleaner to traverse the row portion after rotating in the rotation direction at the first cleaning point. In some instances, the controller may be configured to cause the robotic cleaner to stop at a second cleaning point on the row portion and rotate in the rotation direction, the second cleaning point separated from the first cleaning point by a point separation distance. In some instances, the point separation distance may be substantially equal to a widest width of the robotic cleaner. In some instances, the point separation distance may be in a range of 25 cm to 50 cm. In some instances, the controller may be configured to cause the robotic cleaner to rotate through one complete rotation in the rotation direction at the second cleaning point.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A robotic cleaner comprising:
   one or more driven wheels;
   one or more environmental sensors;
   one or more edge cleaning implements; and
   a controller having one or more processors and one or more memories, the controller being communicatively coupled to the one or more driven wheels and the one or more environmental sensors, the controller being configured to cause:
      the robotic cleaner to move along a cleaning path that includes one or more row portions and one or more turn-around portions;
      the robotic cleaner to stop forward movement at a first cleaning point;
      the robotic cleaner to rotate in a rotation direction at the first cleaning point, the rotation direction being only one of clockwise or counter clockwise;
      the robotic cleaner to traverse the row portion after rotating in the rotation direction at the first cleaning point; and
      the robotic cleaner to stop at a second cleaning point on the row portion and rotate in the rotation direction, the second cleaning point separated from the first cleaning point by a point separation distance, wherein the point separation distance is substantially equal to a widest width of the robotic cleaner.

2. The robotic cleaner of claim 1, wherein the controller is configured to cause the robotic cleaner to rotate through one complete rotation in the rotation direction at the first cleaning point.

3. The robotic cleaner of claim 1, wherein the controller is configured to cause the robotic cleaner to rotate through one complete rotation in the rotation direction at the second cleaning point.

4. A robotic cleaner comprising:
   one or more driven wheels;
   one or more environmental sensors; and
   a controller having one or more processors and one or more memories, the controller being communicatively coupled to the one or more driven wheels and the one or more environmental sensors, the controller being configured to cause:

the robotic cleaner to move along a cleaning path that includes one or more row portions and one or more turn-around portions;

the robotic cleaner to stop forward movement at a first cleaning point;

the robotic cleaner to rotate in a rotation direction at the first cleaning point, the rotation direction being only one of clockwise or counter clockwise;

the robotic cleaner to traverse the row portion after rotating in the rotation direction at the first cleaning point; and the robotic cleaner to stop at a second cleaning point on the row portion and rotate in the rotation direction, the second cleaning point separated from the first cleaning point by a point separation distance, wherein the point separation distance is in a range of 25 centimeters (cm) to 50 cm.

5. The robotic cleaner of claim 4, wherein the controller is configured to cause the robotic cleaner to rotate through one complete rotation in the rotation direction at the first cleaning point.

6. The robotic cleaner of claim 4, wherein the point separation distance is substantially equal to a widest width of the robotic cleaner.

7. The robotic cleaner of claim 4, wherein the controller is configured to cause the robotic cleaner to rotate through one complete rotation in the rotation direction at the second cleaning point.

8. A robotic cleaner comprising:
one or more driven wheels; and
a controller having one or more processors and one or more memories, the controller being communicatively coupled to the one or more driven wheels, the controller being configured to cause:

the robotic cleaner to move along a cleaning path that includes one or more row portions and one or more turn-around portions;

the robotic cleaner to stop forward movement at a first cleaning point;

the robotic cleaner to rotate in a rotation direction at the first cleaning point, the rotation direction being only one of clockwise or counter clockwise;

the robotic cleaner to traverse the row portion after rotating in the rotation direction at the first cleaning point; and the robotic cleaner to stop at a second cleaning point on the row portion and rotate in the rotation direction, the second cleaning point separated from the first cleaning point by a point separation distance, wherein the point separation distance is substantially equal to a widest width of the robotic cleaner.

9. The robotic cleaner of claim 8, wherein the controller is configured to cause the robotic cleaner to rotate through one complete rotation in the rotation direction at the first cleaning point.

10. The robotic cleaner of claim 8, wherein the controller is configured to cause the robotic cleaner to rotate through one complete rotation in the rotation direction at the second cleaning point.

* * * * *